United States Patent
Biler et al.

(10) Patent No.: US 10,553,365 B2
(45) Date of Patent: Feb. 4, 2020

(54) SOLID ELECTROLYTIC CAPACITOR FOR USE IN EXTREME CONDITIONS

(71) Applicant: AVX Corporation, Fountain Inn, SC (US)

(72) Inventors: Martin Biler, Lanskroun (CZ); Jan Petrzilek, Usti nad Orlici (CZ)

(73) Assignee: AVX Corporation, Fountain Inn, SC (US)

(*) Notice: Subject to any disclaimer, the term of this patent is extended or adjusted under 35 U.S.C. 154(b) by 0 days.

(21) Appl. No.: 16/286,701

(22) Filed: Feb. 27, 2019

(65) Prior Publication Data

US 2019/0198255 A1 Jun. 27, 2019

Related U.S. Application Data

(63) Continuation of application No. 14/198,729, filed on Mar. 6, 2014, now Pat. No. 10,224,151.
(Continued)

(51) Int. Cl.
*H01G 9/15* (2006.01)
*H01G 9/10* (2006.01)
(Continued)

(52) U.S. Cl.
CPC ............. *H01G 9/10* (2013.01); *H01G 9/0029* (2013.01); *H01G 9/08* (2013.01); *H01G 9/15* (2013.01)

(58) Field of Classification Search
CPC ...... H01G 9/0036; H01G 9/025; H01G 9/028; H01G 9/0425; H01G 9/10; H01G 9/15; H01G 9/045
See application file for complete search history.

(56) References Cited

U.S. PATENT DOCUMENTS 3,440,495 A    4/1969   Howard et al.
3,922,773 A   12/1975   Marien et al.
(Continued)

FOREIGN PATENT DOCUMENTS

EP   2239748 A1   10/2010
GB   1069685 A    5/1967
(Continued)

OTHER PUBLICATIONS

Abstract of Japanese Patent—JP2001257130, Sep. 21, 2001, 2 pages.
(Continued)

*Primary Examiner* — Nguyen T Ha
(74) *Attorney, Agent, or Firm* — Dority & Manning, P.A.

(57) ABSTRACT

A capacitor assembly that is capable of performing under extreme conditions, such as at high temperatures and/or high voltages, is provided. The ability to perform at high temperature is achieved in part by enclosing and hermetically sealing the capacitor element within a housing in the presence of a gaseous atmosphere that contains an inert gas, thereby limiting the amount of oxygen and moisture supplied to the solid electrolyte of the capacitor element. Furthermore, the present inventors have also discovered that the ability to perform at high voltages can be achieved through a unique and controlled combination of features relating to the formation of the anode, dielectric, and solid electrolyte. For example, the solid electrolyte is formed from a combination of a conductive polymer and a hydroxy-functional nonionic polymer.

18 Claims, 4 Drawing Sheets

Related U.S. Application Data

(60) Provisional application No. 61/778,848, filed on Mar. 13, 2013.

(51) Int. Cl.
*H01G 9/08* (2006.01)
*H01G 9/00* (2006.01)

(56) References Cited

U.S. PATENT DOCUMENTS

| | | |
|---|---|---|
| 4,131,520 A | 12/1978 | Bernard et al. |
| 4,278,513 A | 7/1981 | Millard et al. |
| 4,479,168 A | 10/1984 | Green, Jr. |
| 4,508,563 A | 4/1985 | Bernard et al. |
| 4,910,645 A | 3/1990 | Jonas et al. |
| 5,111,327 A | 5/1992 | Blohm et al. |
| 5,436,796 A | 7/1995 | Abe et al. |
| 5,457,862 A | 10/1995 | Sakata et al. |
| 5,473,503 A | 12/1995 | Sakata et al. |
| 5,560,761 A | 10/1996 | Naito |
| 5,586,000 A | 12/1996 | Sakata et al. |
| 5,643,432 A | 7/1997 | Qiu |
| 5,694,287 A | 12/1997 | Nishiyama et al. |
| 5,729,428 A | 3/1998 | Sakata et al. |
| 5,812,367 A | 9/1998 | Kudoh et al. |
| 6,197,252 B1 | 3/2001 | Bishop et al. |
| 6,231,993 B1 | 5/2001 | Stephenson et al. |
| 6,261,434 B1 | 7/2001 | Melody et al. |
| 6,322,912 B1 | 11/2001 | Fife |
| 6,350,406 B1 | 2/2002 | Satou et al. |
| 6,391,275 B1 | 5/2002 | Fife |
| 6,416,730 B1 | 7/2002 | Fife |
| 6,527,937 B2 | 3/2003 | Fife |
| 6,576,099 B2 | 6/2003 | Kimmel et al. |
| 6,635,729 B1 | 10/2003 | Groenendaal et al. |
| 6,674,635 B1 | 1/2004 | Fife et al. |
| 6,798,644 B1 | 9/2004 | Piller et al. |
| 6,804,109 B1 | 10/2004 | Hahn et al. |
| 6,987,663 B2 | 1/2006 | Merker et al. |
| 7,118,690 B2 | 10/2006 | Wessling et al. |
| 7,220,397 B2 | 5/2007 | Kimmel et al. |
| 7,221,554 B2 | 5/2007 | Brenneman et al. |
| 7,262,511 B2 | 8/2007 | Osako et al. |
| 7,262,954 B1 | 8/2007 | Iida et al. |
| 7,279,015 B2 | 10/2007 | Merker |
| 7,304,832 B2 | 12/2007 | Ushio et al. |
| 7,341,705 B2 | 3/2008 | Schnitter |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,515,396 B2 | 4/2009 | Biler |
| 7,554,793 B2 | 6/2009 | Chacko |
| 7,563,290 B2 | 7/2009 | Qiu et al. |
| 7,679,885 B2 | 3/2010 | Mizusaki et al. |
| 7,724,502 B2 | 5/2010 | Petrzilek et al. |
| 7,750,099 B2 | 7/2010 | Chikusa et al. |
| 7,785,493 B2 | 8/2010 | Jonas et al. |
| 7,898,794 B2 | 3/2011 | Haas et al. |
| 7,948,069 B2 | 5/2011 | Zhuang |
| 7,972,534 B2 | 7/2011 | Merker et al. |
| 7,973,180 B2 | 7/2011 | Morita et al. |
| 7,990,683 B2 | 8/2011 | Qiu et al. |
| 8,027,151 B2 | 9/2011 | Kikuchi et al. |
| 8,058,135 B2 | 11/2011 | Merker et al. |
| 8,094,434 B2 | 1/2012 | Rawal et al. |
| 8,124,277 B2 | 2/2012 | Anada et al. |
| 8,194,395 B2 | 6/2012 | Zednicek et al. |
| 8,279,584 B2 | 10/2012 | Zednickova |
| 8,293,848 B2 | 10/2012 | Plantenberg et al. |
| 8,300,387 B1 | 10/2012 | Zednickova et al. |
| 8,308,825 B2 | 11/2012 | Freeman et al. |
| 8,310,815 B2 | 11/2012 | Freeman et al. |
| 8,313,538 B2 | 11/2012 | Merker et al. |
| 8,323,361 B2 | 12/2012 | Freeman et al. |
| 8,349,030 B1 | 1/2013 | Hussey et al. |
| 8,379,372 B2 | 2/2013 | Zednicek et al. |
| 8,441,776 B2 | 5/2013 | Komatsu et al. |
| 8,456,803 B2 | 6/2013 | Merker et al. |
| 8,576,544 B2 | 11/2013 | Rawal et al. |
| 8,780,530 B2 | 7/2014 | Zednicek et al. |
| 8,848,342 B2 | 9/2014 | Uher et al. |
| 8,945,485 B2 | 2/2015 | Chen et al. |
| 9,030,807 B2 | 5/2015 | Chacko et al. |
| 9,208,954 B2 | 12/2015 | Matsuura et al. |
| 9,384,866 B2 | 7/2016 | Jibiki et al. |
| 10,224,151 B2 * | 3/2019 | Biler .................... H01G 9/0029 |
| 2003/0105207 A1 | 6/2003 | Kleyer et al. |
| 2004/0190227 A1 | 9/2004 | Takatani et al. |
| 2005/0111165 A1 | 5/2005 | Merker et al. |
| 2005/0218005 A1 | 10/2005 | Liu et al. |
| 2007/0171596 A1 | 7/2007 | Chacko et al. |
| 2009/0109603 A1 | 4/2009 | Nobua et al. |
| 2009/0244812 A1 * | 10/2009 | Rawal ..................... H01G 2/06 361/525 |
| 2010/0085685 A1 | 4/2010 | Pinwill |
| 2010/0155645 A1 * | 6/2010 | Liu ......................... C25D 3/54 252/62.2 |
| 2010/0157510 A1 | 6/2010 | Miyachi et al. |
| 2011/0019339 A1 | 1/2011 | Merker et al. |
| 2011/0096466 A1 * | 4/2011 | Horacek ............. H01G 9/0036 361/525 |
| 2011/0168946 A1 | 7/2011 | Loevenich et al. |
| 2011/0182002 A1 | 7/2011 | Takahashi et al. |
| 2012/0044615 A1 | 2/2012 | Takahashi et al. |
| 2012/0057275 A1 | 3/2012 | Intelmann et al. |
| 2012/0063063 A1 | 3/2012 | Qiu et al. |
| 2012/0106031 A1 | 5/2012 | Vilc et al. |
| 2012/0206860 A1 | 8/2012 | Chen et al. |
| 2012/0257325 A1 | 10/2012 | Zednickova |
| 2012/0300368 A1 * | 11/2012 | Matsuura ............. H01G 9/035 361/506 |
| 2013/0070393 A1 | 3/2013 | Kamiyama et al. |
| 2013/0261261 A1 | 10/2013 | Lövenich |
| 2013/0271894 A1 | 10/2013 | Biler |
| 2013/0279079 A1 * | 10/2013 | Merker ................. H01G 9/0029 361/528 |
| 2013/0295389 A1 | 11/2013 | Ishikawa et al. |
| 2013/0300370 A1 | 11/2013 | Hotta |
| 2013/0316231 A1 * | 11/2013 | Iijima ..................... C09D 5/14 429/211 |
| 2014/0022702 A1 | 1/2014 | Petrzilek et al. |
| 2014/0022703 A1 | 1/2014 | Petrzilek et al. |
| 2014/0022704 A1 | 1/2014 | Petrzilek et al. |
| 2014/0078646 A1 | 3/2014 | Chacko et al. |
| 2014/0340819 A1 | 11/2014 | Zhang et al. |
| 2015/0029642 A1 | 1/2015 | Shi et al. |
| 2015/0047889 A1 * | 2/2015 | Asteman ............... C08G 65/334 174/260 |

FOREIGN PATENT DOCUMENTS

| | | | |
|---|---|---|---|
| GB | 2489786 A | 10/2012 | |
| JP | 2003168633 | 6/2003 | |
| JP | 2010129864 | 6/2010 | |
| JP | 2011091413 * | 5/2011 | ............ H01G 9/028 |
| WO | WO2012041506 A2 | 4/2012 | |
| WO | WO2012041506 A3 | 4/2012 | |
| WO | WO2012048824 A1 | 4/2012 | |
| WO | WO2012119711 A1 | 9/2012 | |
| WO | WO2012136305 A1 | 10/2012 | |

OTHER PUBLICATIONS

Abstract of Japanese Patent—JP2010090397, Apr. 22, 2010, 1 page.
Abstract of Japanese Patent—JPH01140621, Jun. 1, 1989, 1 page.
Abstract of Japanese Patent—JPH03109712, May 9, 1991, 2 pages.
Abstract of Japanese Patent—JPH03109713, May 9, 1991, 2 pages.
Abstract of Japanese Patent—JPH03109714 May 9, 1991, 2 pages.
Abstract of Japanese Patent—JPH03127813, May 30, 1991, 1 page.
Abstract of WO Patent—WO2010015468, Feb. 11, 2010, 1 page.
Article—Balaji et al., "Sintering and electrical properties of tanta-

(56) References Cited

OTHER PUBLICATIONS lum anodes for capacitor applications," *Materials Letters*, vol. 56, 2002, pp. 560-563.
Article—Helmut Haas, "Magnesium Vapour Reduced Tantalum Powders with Very High Capacitances," *CARTS Europe 2004*, 18th Annual Passive Components Conference, Oct. 18, 21, 2004, 4. pages.
Article—Pozdeev-Freeman et al., "Critical oxygen content in porous anodes of solid tantalum capacitors," *Journal of Materials Science: Materials in Electronics*, vol. 9, 1998, pp. 309-311.
Article—Simkins et al, "Tantalum Powders for High Voltage Applications II," *CARTS 2004*, 24th Annual Capacitor and Resistor Technology Symposium, Mar. 29-Apr. 1, 2004.
Machine Translation of Japanese Patent—JP2005217129, Aug. 11, 2005, 11 pages.
Material Safety Data Sheet from MetLab Corporation on Polyethylene Glycol, 7 pages, Jan. 2011.
Paper—Bates et al., "Reaching the Highest Reliability for Tantalum Capacitors," *CART International 2013*, Mar. 25-28, 2013, 12 pages.
Paper—Freeman et al, "How High Working Voltage Can Go in Polymer Tantalum Capacitors," CARTS USA 2011, Jacksonville, Florida, Mar. 28-31, 2011, 15 pages.
Paper—Freeman et al., "Electrical Characterization of Polymer Tantalum Capacitors with Poly(3,4-Ethylenedioxythiophene) Cathode," Journal of the Electrical Society, vol. 156, No. 6, 2009, 10 pages and CARTS Europe 2008, Helsinki, Finland, Oct. 20-23, 2008.
Paper—Freeman et al., "How Far We Can Go with Hi CV Ta Capacitors," CARTS Europe 2004, 18th Annual Passive Components Conference, Oct. 18-21, 2004.
Paper—Freeman et al., "Low Voltage CV Loss in Tantalum Capacitors," CARTS USA 2010, New Orleans, LA, Mar. 16, 2010, 12 pages.
Paper—Freeman et al., "Reliability and Critical Applications of Tantalum Capacitors," CARTS Europe 2007 Symposium, Oct.-Nov. 2007, Barcelona, Spain, pp. 193-204.
Paper—Freeman, et al., "Stable, Reliable, and Efficient Tantalum Capacitors," CARTS USA 2008, 28th Symposium, for Passive Electronics, March, Newport Beach, California, 6 pages.
Paper—Merker et al., "Conducting Polymer-Dispersions for High Capacitance Tantalum Capacitors,": CARTS Europe 2006, Sep. 2006, Bad Homburg, Germany 6 pages.
Paper—Marker et al., "New Conducting Polymer Dispersions for Solid Electrolytic Capacitors," CARTS Europe 2005, Oct. 17-20, 2005, Prague, CZ Republic, 6 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Paper—Petrzilek et al., "Hermetically Sealed SMD Tantalum Capacitors," *CARTS USA 2012*, 6 pages.
Paper—Petrzilek et al., "Next Generation of High Voltage, Low ESR Tantalum Conductive Polymer Capacitors," *CARTS USA 2011*, Jacksonville, Florida, Mar. 28-31, 2011, 9 pages.
Paper—Simpson et al., "Advances and Applications of Inherently Conductive Polymer Technologies Based on Poly(3,4-Ethylenedioxythiophene)," 2005 AIMCAL Fall Technical Conference and 19th International Vacuum Web Coating Conference, Oct. 16-20, 2005, Session 5: Advances in Technology, Myrtle Beach, SC, 10 pages.
Paper—Young et al., "High Voltage Tantalum Polymer Capacitors," CARTS Europe 2008, Helsinki, Finland, Oct. 20-23, 2008.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Paper—Zednicek et al, "Hermetically Sealed 230C $MnO_2$ Tantalum Capacitors," *CARTS International 2013*, Mar. 25-28, 2013 8 pages.
Presentation—Freeman et al., "Hermetically Sealed Polymer Tantalum Capacitors," CMSE Europe 2010.
Press Release—AVX's New I25V Tantalum Polymer SMD Capacitors Surpass Previous 100V Milestone, Jun. 24, 2013, 2 pages.
Product Information for Tantalum Polymer Through-Hole Capacitors, T550 Polymer Hermetic Seal (PHS) Series, from Kemet, 2011, 2 pages.
Thesis—Brian Holman, "The Electrical Charcterization of Tantalum Capacitors as MIS Devices," Aug. 2008, Clemson University, 128 pages.
Thesis—Githin Francis Alapatt, "Investigating Pre-Breakdown Currents in Polymers Tantalum Capacitors," Aug. 2010, Clemson University, 102 pages.
Search Report for GB1402995.3 dated Jul. 23, 2014, 4 pages.
Related Application Form.

* cited by examiner

SOLID ELECTROLYTIC CAPACITOR FOR USE IN EXTREME CONDITIONS

RELATED APPLICATIONS

The present application is a continuation of U.S. application Ser. No. 14/198,729 having a filing date of Mar. 6, 2014, which claims priority to U.S. Provisional Application Ser. No. 61/778,848 (filed on Mar. 13, 2013), and which are incorporated herein in their entirety by reference thereto.

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al. Unfortunately, however, the stability of such solid electrolytes is poor at high temperatures due to the tendency to transform from a doped to an un-doped state, or vice versa. In response to these and other problems, capacitors have been developed that are hermetically sealed to limit the contact of oxygen with the conductive polymer during use. U.S. Patent Publication No. 2009/0244812 to Rawal, et al., for instance, describes a capacitor assembly that includes a conductive polymer capacitor that is enclosed and hermetically sealed within a ceramic housing in the presence of an inert gas. According to Rawal, et al., the ceramic housing limits the amount of oxygen and moisture supplied to the conductive polymer so that it is less likely to oxidize in high temperature environments, thus increasing the thermal stability of the capacitor assembly. Despite the benefits achieved, however, problems nevertheless remain. For example, the capacitor can sometimes become instable under extreme conditions (e.g., high temperature of above about 175° C. and/or high voltage of above about 35 volts), leading to poor electrical performance.

As such, a need currently exists for a solid electrolytic capacitor assembly having improved performance under extreme conditions.

SUMMARY OF THE INVENTION

In accordance with one embodiment of the present invention, a capacitor assembly is disclosed that comprises a capacitor element, housing, anode termination, and cathode termination. The capacitor element comprises a sintered porous anode body, a dielectric layer that overlies the anode body, and a solid electrolyte overlying the dielectric layer. The solid electrolyte comprises a conductive polymer and a hydroxyl-functional nonionic polymer. A housing defines an interior cavity within which the capacitor element is positioned and hermetically sealed, wherein the interior cavity has a gaseous atmosphere that contains an inert gas.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
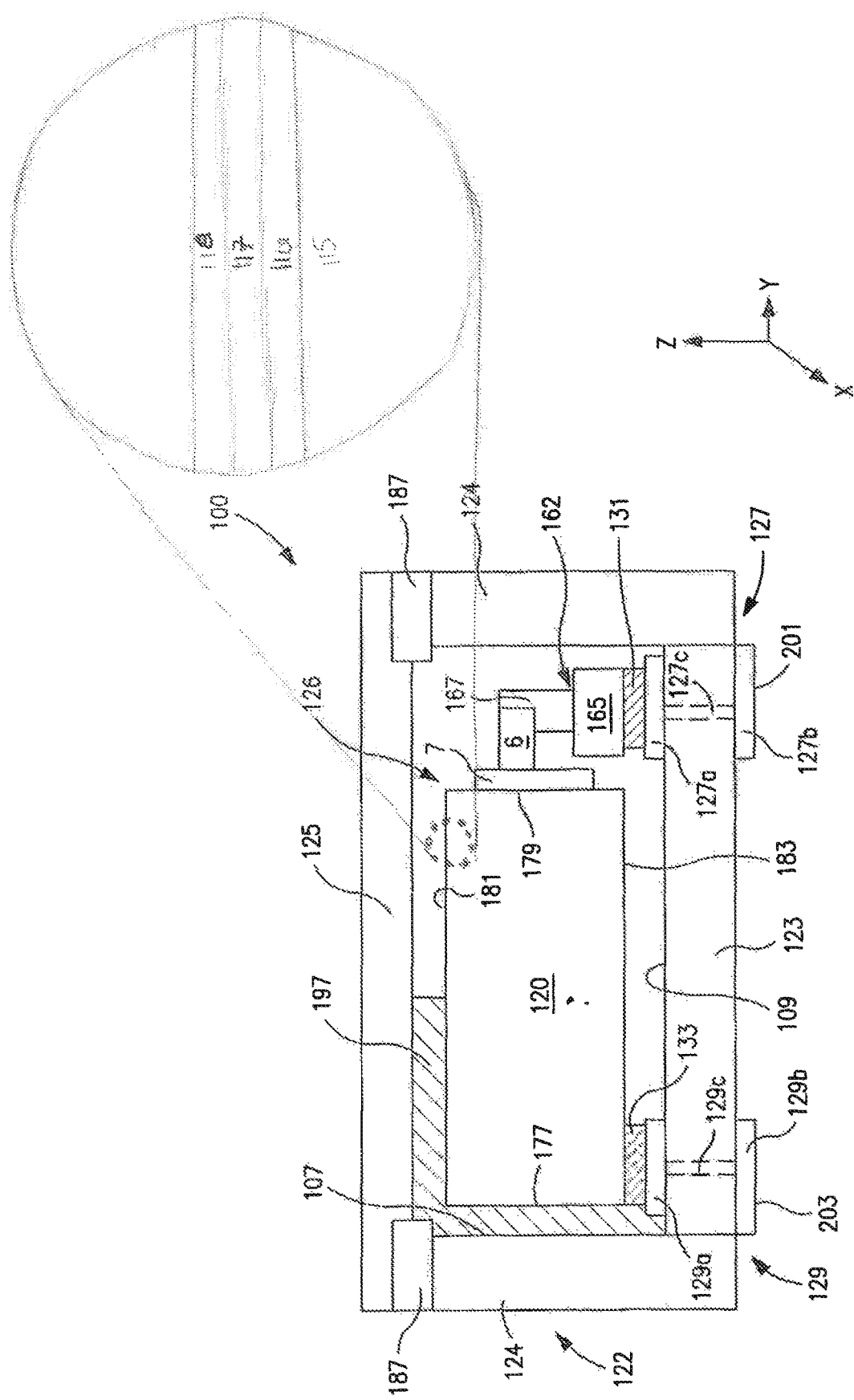
FIG. 1 is a cross-sectional view of one embodiment of a capacitor assembly of the assembly of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly that is capable of performing under extreme conditions, such as at high temperatures and/or high voltages. The ability to perform at high temperature is achieved in part by enclosing and hermetically sealing the capacitor element within a housing in the presence of a gaseous atmosphere that contains an inert gas, thereby limiting the amount of oxygen and moisture supplied to the solid electrolyte of the capacitor element. Furthermore, the present inventors have also discovered that the ability to perform at high voltages can be achieved through a unique and controlled combination of features relating to the formation of the anode, dielectric, and solid electrolyte. For example, the solid electrolyte is formed from a combination of a conductive polymer and a hydroxy-functional nonionic polymer. Without intending to be limited by theory, it is believed that hydroxy-functional nonionic polymers can improve the degree of contact between the polymer particles and the surface of the internal dielectric, which is typically relatively smooth in nature as a result of higher forming voltages. This unexpectedly increases the breakdown voltage and wet-to-dry capacitance of the resulting capacitor.

As a result of the present invention, the capacitor assembly may exhibit excellent electrical properties even when exposed to high temperature and/or high voltage environments. For example, the capacitor assembly may exhibit a relatively high "breakdown voltage" (voltage at which the capacitor fails), such as about 35 volts or more, in some embodiments about 50 volts or more, in some embodiments about 60 volts or more, and in some embodiments, from about 60 volts to about 100 volts, such as determined by increasing the applied voltage in increments of 3 volts until the leakage current reaches 1 mA. Likewise, the capacitor may also be able to withstand relatively high surge currents, which is also common in high voltage applications. The peak surge current may, for example, about 2 times the rated voltage or more, such as range from about 40 Amps or more, in some embodiments about 60 Amps or more, and in some embodiments, from about 120 Amps to about 250 Amps. The capacitor may also exhibit a relatively high capacitance. The dry capacitance may be relatively similar to the wet capacitance, which enables the capacitor to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

For instance, the capacitor assembly may exhibit a wet-to-dry capacitance percentage of about 50% or more, in some embodiments about 60% or more, in some embodiments about 70% or more, and in some embodiments, from about 80% to 100%. The capacitor assembly may also maintain a low equivalence series resistance ("ESR"), such as less than about 100 mohms, in some embodiments less than about 75 mohms, in some embodiments from about 0.01 to about 60 mohms, and in some embodiments, from about 0.05 to about 50 mohms, measured at an operating frequency of 100 kHz. In certain cases, such improved capacitance and ESR performance can remain stable under a variety of temperature different conditions. For example, the capacitance and/or equivalent series resistance of the capacitor may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from about 100° C. to about 250° C., and, in some embodiments from about 100° C. to about 240° C., in some embodiments, from about 100° C. to about 230° C., and in some embodiments, from about 175° C. to about 225° C. (e.g., 175° C. or 200'C).

Various embodiments of the present invention will now be described in more detail.

I. Capacitor Element

A. Anode

The anode body of the anode is formed from a valve metal composition. The specific charge of the composition may vary, such as from about 2,000 μF*V/g to about 150,000 μF*V/g, in some embodiments from about 3,000 μF*V/g to about 70,000 μF*V/g or more, and in some embodiments, from about 4,000 to about 50,000 μF*V/g. As is known in the art, the specific charge may be determined by multiplying capacitance by the anodizing voltage employed, and then dividing this product by the weight of the anodized electrode body.

The valve metal composition generally contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al., and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al.

To form the anode body, a powder of the valve metal composition is generally employed. The powder may contain particles any of a variety of shapes, such as nodular, angular, flake, etc., as well as mixtures thereof. In particular embodiments, the particles can have a flake-like morphology in that they possess a relatively flat or platelet shape. Such particles can provide a short transmission line between the outer surface and interior of the anode and also provide a highly continuous and dense wire-to-anode connection with high conductivity. Among other things, this may help increase the breakdown voltage (voltage at which the capacitor fails) and help lower equivalent series resistance ("ESR"). The particles may also increase the specific charge of the anode when anodized at higher voltages, thereby increasing energy density.

When employed, the flake particles are generally flat. The degree of flatness is generally defined by the "aspect ratio", i.e., the average diameter or width of the particles divided by the average thickness ("D/T"). For example, the aspect ratio of the particles may be from about 2 to about 100, in some embodiments from about 3 to about 50, in some embodiments, from about 4 to about 30. The particles may also have a specific surface area of from about 0.5 to about 10.0 m$^2$/g, in some embodiments from about 0.7 to about 5.0 m$^2$/g, and in some embodiments, from about 1.0 to about 4.0 m$^2$/g. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas. The test may be conducted with a MONOSORB® Specific Surface Area Analyzer available from QUANTACHROME Corporation, Syosset, N.Y., which measures the quantity of adsorbate nitrogen gas adsorbed on a solid surface by sensing the change in thermal conductivity of a flowing mixture of adsorbate and inert carrier gas (e.g., helium).

The bulk density (also known as Scott density) is also typically from about 0.1 to about 2 grams per cubic centimeter (g/cm$^3$), in some embodiments from about 0.2 g/cm$^3$ to about 1.5 g/cm$^3$, and in some embodiments, from about 0.4 g/cm$^3$ to about 1 g/cm$^3$. "Bulk density" may be determined using a flow meter funnel and density cup. More specifically, the powder sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, N.J. The particles may also have an average size (e.g., width) of from about 0.1 to about 100 micrometers, in some embodiments from about 0.5 to about 70 micrometers, and in some embodiments, from about 1 to about 50 micrometers.

Certain additional components may also be included in the powder. For example, the powder may be optionally mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop et. al. Thereafter, the porous body is sintered to form an integral mass. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

The resulting anode may have a relatively low carbon and oxygen content. For example, the anode may have no more than about 50 ppm carbon, and in some embodiments, no more than about 10 ppm carbon. Likewise, the anode may have no more than about 3500 ppm oxygen, in some embodiments no more than about 3000 ppm oxygen, and in some embodiments, from about 500 to about 2500 ppm oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

As noted above, an anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

B. Dielectric.

A dielectric, as may be generally shown by reference numeral 116 also overlies or coats the anode body, as may be generally shown by reference numeral 115. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

Although not required, in certain embodiments, the dielectric layer may possess a differential thickness throughout the anode body in that it possesses a first portion that overlies an external surface of the anode body and a second portion that overlies an interior surface of the anode body. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode body is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode body. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode body may also be rinsed or washed with another solvent (e.g., water) after the first and/or second stages to remove the electrolyte.

C. Solid Electrolyte
i. Conductive Polymer

As indicated above, a solid electrolyte overlies the dielectric that generally functions as the cathode for the capacitor. The solid electrolyte contains a conductive polymer, which is typically π-conjugated and has electrical conductivity after oxidation or reduction, such as an electrical conductivity of at least about 1 µS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

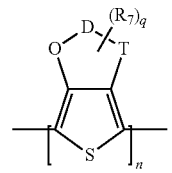

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

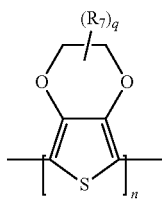

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

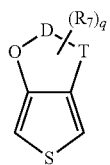

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

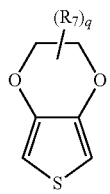

wherein, $R_7$ and q are as defined above. In one particular embodiment, "q" is 0. One commercially suitable example of 3,4-ethylenedioxthiophene is available from H. C. Starck GmbH under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Various methods may be utilized to form the conductive polymer layer. For example, an in situ polymerized layer may be formed by chemically polymerizing monomers in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron(III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron(III) salts of aliphatic perfluorosulfonic acids (e.g., trifluoromethane sulfonic acid, perfluorobutane sulfonic acid, or perfluorooctane sulfonic acid); iron(III) salts of aliphatic $C_1$ to $C_{20}$ carboxylic acids (e.g., 2-ethylhexylcarboxylic acid); iron(III) salts of aliphatic perfluorocarboxylic acids (e.g., trifluoroacetic acid or perfluorooctane acid); iron(III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron(III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, the conductive polymer solid electrolyte may also be applied in the form of a dispersion of conductive polymer particles. One benefit of employing a dispersion is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage." To enable good impregnation of the anode, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Adhesives may also be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropylt-rimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and/or washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments, from about 2:1 to about 20:1.

ii. Hydroxy-Functional Nonionic Polymer

A hydroxyl-functional nonionic polymer, as described in detail above, is also included in the solid electrolyte. The term "hydroxy-functional" generally means that the compound contains at least one hydroxyl functional group or is capable of possessing such a functional group in the presence of a solvent. Without intending to be limited by theory, it is believed that hydroxy-functional nonionic polymers can improve the degree of contact between the conductive polymer and the surface of the internal dielectric, which is typically relatively smooth in nature as a result of higher forming voltages. This unexpectedly increases the breakdown voltage and wet-to-dry capacitance of the resulting capacitor. Furthermore, it is believed that the use of a hydroxy-functional polymer with a certain molecular weight can also minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from dials or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diaos or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—$OH$ (e.g., octaethylene glycol monododecyl ether and pentaethylene glycol monododecyl ether); polyoxypropylene glycol alkyl ethers having the general formula; $CH_3$—$(CH_2)_{10\text{-}16}$—$(O$—$C_3H_6)_{1\text{-}25}$—$OH$; polyoxyethylene glycol octylphenol ethers having the following general formula: $C_8H_{17}$—$(C_6H_4)$—$(O$—$C_2H_4)_{1\text{-}25}$—$OH$ (e.g., Triton™ X-100); polyoxyethylene glycol alkylphenol ethers having the following general formula: $C_9H_{19}$—$(C_6H_4)$—$(O$—$C_2H_4)_{1\text{-}25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated into the solid electrolyte in a variety of different ways. In certain embodiments, for instance, the nonionic polymer may simply be incorporated into any conductive polymer layer(s) formed by a method as described above (e.g., in situ polymerization or pre-polymerized particle dispersion). In such embodiments, the concentration of the nonionic polymer in the layer may be from about 1 wt. % to about 50 wt. %, in some embodiments from about 5 wt. % to about 40 wt. %, and in some embodiments, from about 10 wt. % to about 30 wt. %.

In other embodiments, however, the nonionic polymer may be applied after the initial polymer layer(s) are formed. In such embodiments, the technique used to apply the nonionic polymer may vary. For example, the nonionic polymer may be applied in the form of a liquid solution using various methods, such as immersion, dipping, pouring, dripping, injection, spraying, spreading, painting or printing, for example, inkjet, screen printing or tampon printing. Solvents known to the person skilled in the art can be employed in the solution, such as water, alcohols, or a mixture thereof. The concentration of the nonionic polymer in such a solution typically ranges from about 5 wt. % to about 95 wt. %, in some embodiments from about 10 wt. % to about 70 wt. %, and in some embodiments, from about 15 wt. % to about 50 wt. % of the solution. If desired, such solutions may be generally free of conductive polymers. For example, conductive polymers may constitute about 2 wt. % or less, in some embodiments about 1 wt. % or less, and in some embodiments, about 0.5 wt. % or less of the solution.

Alternatively, however, it may also be desired to employ a conductive polymer in combination with the nonionic polymer. For example, in certain embodiments, a "second" layer, as may be generally shown by reference numeral 118, that contains a conductive (e.g., in situ polymerized or pre-polymerized particles) and a nonionic polymer is applied to the anode after the "first" layer, as may be generally shown by reference numeral 117, is applied to the anode body. When employed, the conductive particles of the second polymer layer are as described above, although they need not be identical to those optionally employed in the first layer. Regardless, the concentration of the nonionic polymer in the second layer is typically from about 1 wt. % to about 50 wt. %, in some embodiments from about 5 wt. % to about 40 wt. %, and in some embodiments, from about 10 wt. % to about 30 wt. %. Likewise, in those embodiments in which the nonionic polymer is employed in a second layer, it may also be desirable that the first layer is generally free of such nonionic polymers. For example, nonionic polymers may constitute about 2 wt. % or less, in some embodiments about 1 wt. % or less, and in some embodiments, about 0.5 wt. % or less of the first layer. Once applied, the second layer may be dried and/or washed. One or more additional layers may also be formed in this manner to achieve the desired thickness. Typically, the total thickness of the layers formed by the second polymer dispersion is from about 0.1 to about 5 µm, in some embodiments from about 0.1 to about 3 µm, and in some embodiments, from about 0.2 to about 1 µm.

D. External Polymer Coating

Although not required, an external polymer coating may also be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 50 to about 500 nanometers, in some embodiments from about 80 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 µm, in some embodiments from about 2 to about 40 µm, and in some embodiments, from about 5 to about 20 µm.

E. Other Components of the Capacitor

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1\times10^5$ Ω·cm, and in some embodiments, greater than about $1\times10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Generally speaking, the capacitor element is substantially free of resins (e.g., epoxy resins) that encapsulate the capacitor element as are often employed in conventional solid electrolytic capacitors. Among other things, the encapsulation of the capacitor element can lead to instability in extreme environments, i.e., high temperature (e.g., above about 175° C.) and/or high voltage (e.g., above about 35 volts).

II. Housing

As indicated above, the capacitor element is hermetically sealed within a housing. Hermetic sealing typically occurs in the presence of a gaseous atmosphere that contains at least one inert gas so as to inhibit oxidation of the solid electrolyte during use. The inert gas may include, for instance, nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing. For example, the moisture content (expressed in terms of relatively humidity) may be about 10% or less, in some embodiments about 5% or less, in some embodiments about 1% or less, and in some embodiments, from about 0.01 to about 5%.

Any of a variety of different materials may be used to form the housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof.

The housing may have any desired shape, such as cylindrical, D-shaped, rectangular, triangular, prismatic, etc. Referring to FIG. 1, for example, one embodiment of a capacitor assembly 100 is shown that contains a housing 122 and a capacitor element 120. In this particular embodiment, the housing 122 is generally rectangular. Typically, the housing and the capacitor element have the same or similar shape so that the capacitor element can be readily accommodated within the interior cavity. In the illustrated embodiment, for example, both the capacitor element 120 and the housing 122 have a generally rectangular shape.

If desired, the capacitor assembly of the present invention may exhibit a relatively high volumetric efficiency. To facilitate such high efficiency, the capacitor element typically occupies a substantial portion of the volume of an interior cavity of the housing. For example, the capacitor element may occupy about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior cavity of the housing. To this end, the difference between the dimensions of the capacitor element and those of the interior cavity defined by the housing are typically relatively small.

Referring to FIG. 1, for example, the capacitor element 120 may have a length (excluding the length of the anode lead 6) that is relatively similar to the length of an interior cavity 126 defined by the housing 122. For example, the ratio of the length of the anode to the length of the interior cavity ranges from about 0.40 to 1.00, in some embodiments from about 0.50 to about 0.99, in some embodiments from about 0.60 to about 0.99, and in some embodiments, from about 0.70 to about 0.98. The capacitor element 120 may have a length of from about 5 to about 10 millimeters, and the interior cavity 126 may have a length of from about 6 to about 15 millimeters. Similarly, the ratio of the height of the capacitor element 120 (in the −z direction) to the height of the interior cavity 126 may range from about 0.40 to 1.00, in some embodiments from about 0.50 to about 0.99, in some embodiments from about 0.60 to about 0.99, and in some embodiments, from about 0.70 to about 0.98. The ratio of the width of the capacitor element 120 (in the −x direction) to the width of the interior cavity 126 may also range from about 0.50 to 1.00, in some embodiments from about 0.60 to about 0.99, in some embodiments from about 0.70 to about 0.99, in some embodiments from about 0.80 to about 0.98, and in some embodiments, from about 0.85 to about 0.95. For example, the width of the capacitor element 120 may be from about 2 to about 7 millimeters and the width of the interior cavity 126 may be from about 3 to about 10 millimeters, and the height of the capacitor element 120 may be from about 0.5 to about 2 millimeters and the width of the interior cavity 126 may be from about 0.7 to about 6 millimeters.

Although by no means required, the capacitor element may be attached to the housing in such a manner that an anode termination and cathode termination are formed external to the housing for subsequent integration into a circuit. The particular configuration of the terminations may depend on the intended application. In one embodiment, for example, the capacitor assembly may be formed so that it is surface mountable, and yet still mechanically robust. For example, the anode lead may be electrically connected to external, surface mountable anode and cathode terminations (e.g., pads, sheets, plates, frames, etc.). Such terminations may extend through the housing to connect with the capacitor. The thickness or height of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

In certain embodiments, connective members may be employed within the interior cavity of the housing to facilitate connection to the terminations in a mechanically stable manner. For example, referring again to FIG. 1, the capacitor assembly 100 may include a connection member 162 that is formed from a first portion 167 and a second portion 165. The connection member 162 may be formed from conductive materials similar to the external terminations. The first portion 167 and second portion 165 may be integral or separate pieces that are connected together, either directly or via an additional conductive element (e.g., metal). In the illustrated embodiment, the second portion 165 is provided in a plane that is generally parallel to a lateral direction in which the lead 6 extends (e.g., −y direction). The first portion 167 is "upstanding" in the sense that it is provided in a plane that is generally perpendicular the lateral direction in which the lead 6 extends. In this manner, the first portion 167 can limit movement of the lead 6 in the horizontal direction to enhance surface contact and mechanical stability during use. If desired, an insulative material 7 (e.g., Teflon™ washer) may be employed around the lead 6.

The first portion 167 may possess a mounting region (not shown) that is connected to the anode lead 6. The region may have a "U-shape" for further enhancing surface contact and mechanical stability of the lead 6. Connection of the region to the lead 6 may be accomplished using any of a variety of known techniques, such as welding, laser welding, conductive adhesives, etc. In one particular embodiment, for example, the region is laser welded to the anode lead 6. Regardless of the technique chosen, however, the first portion 167 can hold the anode lead 6 in substantial horizontal alignment to further enhance the dimensional stability of the capacitor assembly 100.

Referring again to FIG. 1, one embodiment of the present invention is shown in which the connective member 162 and capacitor element 120 are connected to the housing 122 through anode and cathode terminations 127 and 129, respectively. More specifically, the housing 122 of this embodiment includes an outer wall 123 and two opposing sidewalls 124 between which a cavity 126 is formed that includes the capacitor element 120. The outer wall 123 and sidewalls 124 may be formed from one or more layers of a metal, plastic, or ceramic material such as described above.

In this particular embodiment, the anode termination 127 contains a first region 127a that is positioned within the housing 122 and electrically connected to the connection member 162 and a second region 127b that is positioned external to the housing 122 and provides a mounting surface 201. Likewise, the cathode termination 129 contains a first region 129a that is positioned within the housing 122 and electrically connected to the solid electrolyte of the capacitor element 120 and a second region 129b that is positioned external to the housing 122 and provides a mounting surface 203. It should be understood that the entire portion of such regions need not be positioned within or external to the housing.

In the illustrated embodiment, a conductive trace 127c extends in the outer wall 123 of the housing to connect the first region 127a and second region 127b. Similarly, a conductive trace 129c extends in the outer wall 123 of the housing to connect the first region 127a and second region 127b. The conductive traces and/or regions of the terminations may be separate or integral. In addition to extending through the outer wall of the housing, the traces may also be positioned at other locations, such as external to the outer wall. Of course, the present invention is by no means limited to the use of conductive traces for forming the desired terminations.

Regardless of the particular configuration employed, connection of the terminations 127 and 129 to the capacitor element 120 may be made using any known technique, such as welding, laser welding, conductive adhesives, etc. In one particular embodiment, for example, a conductive adhesive 131 is used to connect the second portion 165 of the connection member 162 to the anode termination 127. Likewise, a conductive adhesive 133 is used to connect the cathode of the capacitor element 120 to the cathode termination 129. The conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Optionally, a polymeric restraint may also be disposed in contact with one or more surfaces of the capacitor element, such as the rear surface, front surface, upper surface, lower surface, side surface(s), or any combination thereof. The polymeric restraint can reduce the likelihood of delamination by the capacitor element from the housing. In this regard, the polymeric restraint may possesses a certain degree of strength that allows it to retain the capacitor element in a relatively fixed positioned even when it is subjected to vibrational forces, yet is not so strong that it cracks. For example, the restraint may possess a tensile strength of from about 1 to about 150 Megapascals ("MPa"), in some embodiments from about 2 to about 100 MPa, in some embodiments from about 10 to about 80 MPa, and in some embodiments, from about 20 to about 70 MPa, measured at a temperature of about 25° C. It is normally desired that the restraint is not electrically conductive.

Although any of a variety of materials may be employed that have the desired strength properties noted above, curable thermosetting resins have been found to be particularly suitable for use in the present invention. Examples of such resins include, for instance, epoxy resins, polyimides, melamine resins, urea-formaldehyde resins, polyurethanes, silicone polymers, phenolic resins, etc. In certain embodiments, for example, the restraint may employ one or more polyorganosiloxanes. Silicon-bonded organic groups used in these polymers may contain monovalent hydrocarbon and/or monovalent halogenated hydrocarbon groups. Such monovalent groups typically have from 1 to about 20 carbon atoms, preferably from 1 to 10 carbon atoms, and are exemplified by, but not limited to, alkyl (e.g., methyl, ethyl, propyl, pentyl, octyl, undecyl, and octadecyl); cycloalkyl (e.g., cyclohexyl); alkenyl (e.g., vinyl, allyl, butenyl, and hexenyl); aryl (e.g., phenyl, tolyl, xylyl, benzyl, and 2-phenylethyl); and halogenated hydrocarbon groups (e.g., 3,3,3-trifluoropropyl, 3-chloropropyl, and dichlorophenyl). Typically, at least 50%, and more preferably at least 80%, of the organic groups are methyl. Examples of such methylpolysiloxanes may include, for instance, polydimethylsiloxane ("PDMS"), polymethylhydrogensiloxane, etc. Still other suitable methyl polysiloxanes may include dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, etc.

The organopolysiloxane may also contain one more pendant and/or terminal polar functional groups, such as hydroxyl, epoxy, carboxyl, amino, alkoxy, methacrylic, or mercapto groups, which impart some degree of hydrophilicity to the polymer. For example, the organopolysiloxane may contain at least one hydroxy group, and optionally an average of at least two silicon-bonded hydroxy groups (silanol groups) per molecule. Examples of such organopolysiloxanes include, for instance, dihydroxypolydimethylsiloxane, hydroxy-trimethylsiloxypolydimethylsiloxane, etc. Other examples of hydroxyl-modified organopolysiloxanes are described in U.S. Patent Application Publication No. 2003/0105207 to Kleyer, et al., which is incorporated herein in its entirety by reference thereto for all purposes. Alkoxy-modified organopolysiloxanes may also be employed, such as dimethoxypolydimethylsiloxane, methoxy-trimethylsiloxypolydimethylsiloxane, diethoxy-polydimethylsiloxane, ethoxy-trimethylsiloxy-polydimethylsiloxane, etc. Still other suitable organopolysiloxanes are those modified with at least one amino functional group. Examples of such amino-functional polysiloxanes include, for instance, diamino-functional polydimethylsiloxanes. Various other suitable polar functional groups for organopolysiloxanes are also described in U.S. Patent Application Publication No. 2010/00234517 to Plantenberg, et al., which is incorporated herein in its entirety by reference thereto for all purposes.

Epoxy resins are also particularly suitable for use as the polymeric restraint. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other suitable conductive adhesive resins may also be described in U.S. Patent Application Publication No. 2006/0038304 to Osako, et al, and U.S. Pat. No. 7,554,793 to Chacko, which are incorporated herein in their entirety by reference thereto for all purposes.

If desired, curing agents may also be employed in the polymeric restraint to help promote curing. The curing agents typically constitute from about 0.1 to about 20 wt. % of the restraint. Exemplary curing agents include, for instance, amines, peroxides, anhydrides, phenol compounds, silanes, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris(dimethoxyphenyl)phosphine, tris(hydroxypropyl)phosphine, and tris(cyanoethyl)phsphine; phosphonium salts, such as tetraphenylphosphonium tetraphenylborate, methyltributylphosphonium tetraphenylborate, and methyltricyanoethylphosphonium tetraphenylborate); amines, such as 2,4,6-tris(dimethylaminomethyl)phenol, benzylmethylamine, tetramethylbutylguanidine, N-methylpiperazine, and 2-dimethylamino-1-pyrroline; ammonium salts, such as triethylammonium tetraphenylborate; diazabicyclo compounds, such as 1,5-diazabicyclo[5,4,0]-7-undecene, 1,5-diazabicyclo[4,3,0]-5-nonene, and 1,4-diazabicyclo[2,2,2]-octane; salts of diazabicyclo compounds such as tetraphenylborate, phenol salt, phenolnovolac salt, and 2-ethylhexanoic acid salt; and so forth.

Still other additives may also be employed, such as photoinitiators, viscosity modifiers, suspension aiding agents, pigments, stress reducing agents, coupling agents (e.g., silane coupling agents), nonconductive fillers (e.g., clay, silica, alumina, etc.), stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-cholorothioxanthone, etc. When employed, such additives typically constitute from about 0.1 to about 20 wt. % of the total composition.

Referring again to FIG. 1, for instance, one embodiment is shown in which a single polymeric restraint 197 is disposed in contact with an upper surface 181 and rear surface 177 of the capacitor element 120. While a single restraint is shown in FIG. 1, it should be understood that separate restraints may be employed to accomplish the same function. In fact, more generally, any number of polymeric restraints may be employed to contact any desired surface of the capacitor element. When multiple restraints are employed, they may be in contact with each other or remain physically separated. For example, in one embodiment, a second polymeric restraint (not shown) may be employed that contacts the upper surface 181 and front surface 179 of the capacitor element 120. The first polymeric restraint 197 and the second polymeric restraint (not shown) may or may not be in contact with each other. In yet another embodiment, a polymeric restraint may also contact a lower surface 183 and/or side surface(s) of the capacitor element 120, either in conjunction with or in lieu of other surfaces.

Regardless of how it is applied, it is typically desired that the polymeric restraint is also in contact with at least one surface of the housing to help further mechanically stabilize the capacitor element against possible delamination. For example, the restraint may be in contact with an interior surface of one or more sidewall(s), outer wall, lid, etc. In FIG. 1, for example, the polymeric restraint 197 is in contact with an interior surface 107 of sidewall 124 and an interior surface 109 of outer wall 123. While in contact with the housing, it is nevertheless desired that at least a portion of the cavity defined by the housing remains unoccupied to allow for the inert gas to flow through the cavity and limit contact of the solid electrolyte with oxygen. For example, at least about 5% of the cavity volume typically remains unoccupied by the capacitor element and polymer restraint, and in some embodiments, from about 10% to about 50% of the cavity volume.

Once connected in the desired manner, the resulting package is hermetically sealed as described above. Referring again to FIG. 1, for instance, the housing 122 may also include a lid 125 that is placed on an upper surface of side walls 124 after the capacitor element 120 and the polymer restraint 197 are positioned within the housing 122. The lid 125 may be formed from a ceramic, metal (e.g., iron, copper, nickel, cobalt, etc., as well as alloys thereof), plastic, and so forth. If desired, a sealing member 187 may be disposed between the lid 125 and the side walls 124 to help provide a good seal. In one embodiment, for example, the sealing member may include a glass-to-metal seal, Kovar® ring (Goodfellow Camridge, Ltd.), etc. The height of the side walls 124 is generally such that the lid 125 does not contact any surface of the capacitor element 120 so that it is not contaminated. The polymeric restraint 197 may or may not contact the lid 125. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Figure 2:
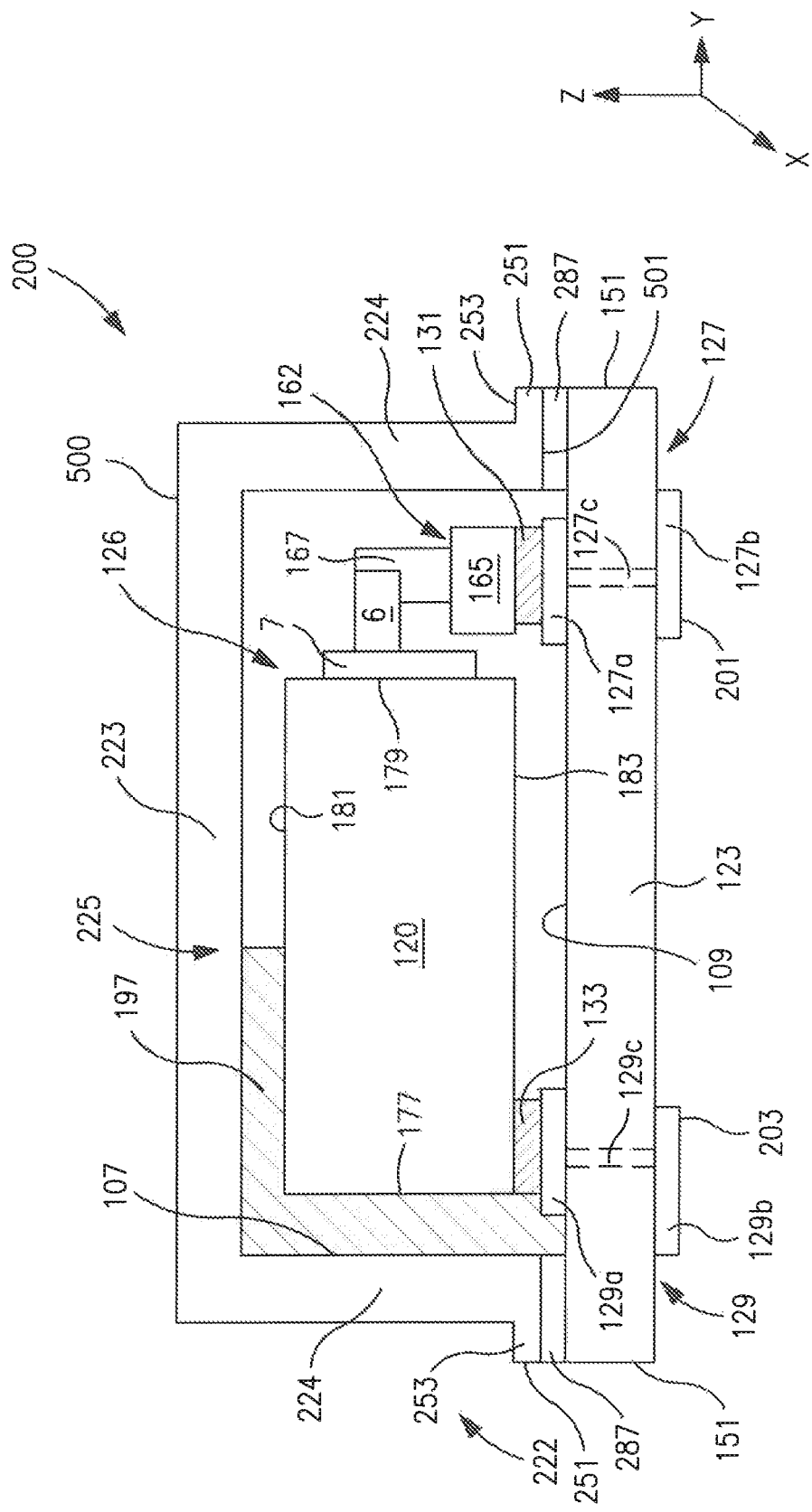
FIG. 2 is a cross-sectional view of another embodiment of a capacitor assembly of the assembly of the present invention.

It should be understood that the embodiments described are only exemplary, and that various other configurations may be employed in the present invention for hermetically sealing a capacitor element within a housing. Referring to FIG. 2, for instance, another embodiment of a capacitor assembly 200 is shown that employs a housing 222 that includes an outer wall 123 and a lid 225 between which a cavity 126 is formed that includes the capacitor element 120 and polymeric restraint 197. The lid 225 includes an outer wall 223 that is integral with at least one sidewall 224. In the illustrated embodiment, for example, two opposing sidewalls 224 are shown in cross-section. The outer walls 223 and 123 both extend in a lateral direction (−y direction) and are generally parallel with each other and to the lateral direction of the anode lead 6. The sidewall 224 extends from the outer wall 223 in a longitudinal direction that is generally perpendicular to the outer wall 123. A distal end 500 of the lid 225 is defined by the outer wall 223 and a proximal end 501 is defined by a lip 253 of the sidewall 224.

The lip 253 extends from the sidewall 224 in the lateral direction, which may be generally parallel to the lateral direction of the outer wall 123. The angle between the sidewall 224 and the lip 253 may vary, but is typically from about 60° to about 120°, in some embodiments from about 70° to about 110°, and in some embodiments, from about 80° to about 100° (e.g., about 90°). The lip 253 also defines a peripheral edge 251, which may be generally perpendicular to the lateral direction in which the lip 253 and outer wall 123 extend. The peripheral edge 251 is located beyond the outer periphery of the sidewall 224 and may be generally coplanar with an edge 151 of the outer wall 123. The lip 253 may be sealed to the outer wall 123 using any known technique, such as welding (e.g., resistance or laser), soldering, glue, etc. For example, in the illustrated embodiment, a sealing member 287 is employed (e.g., glass-to-metal seal, Kovar® ring, etc.) between the components to facilitate their attachment. Regardless, the use of a lip described above can enable a more stable connection between the components and improve the seal and mechanical stability of the capacitor assembly.

Figure 3:
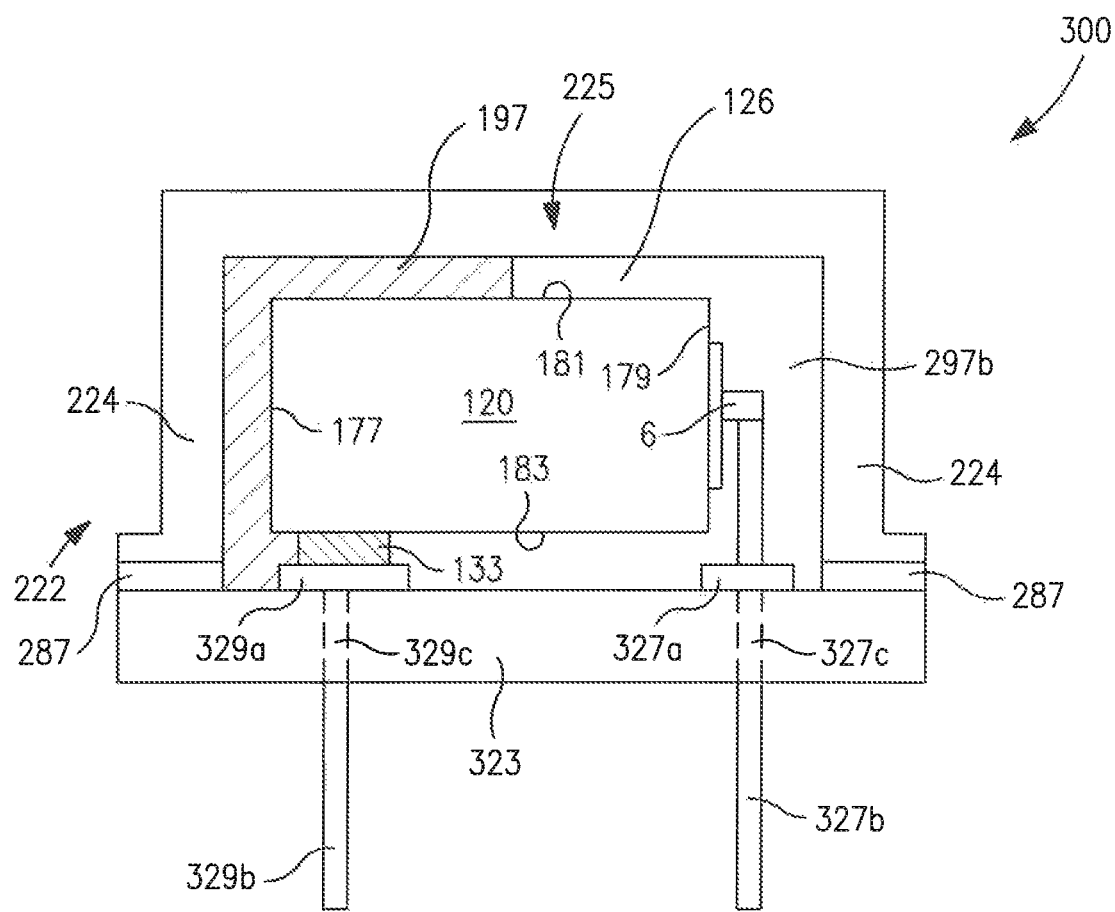
FIG. 3 is a cross-sectional view of yet another embodiment of a capacitor assembly of the assembly of the present invention.

Still other possible housing configurations may be employed in the present invention. For example, FIG. 3 shows a capacitor assembly 300 having a housing configuration similar to that of FIG. 2, except that terminal pins 327b and 329b are employed as the external terminations for the anode and cathode, respectively. More particularly, the terminal pin 327a extends through a trace 327c formed in the outer wall 323 and is connected to the anode lead 6 using known techniques (e.g., welding). An additional section 327a may be employed to secure the pin 327b. Likewise, the terminal pin 329b extends through a trace 329c formed in the outer wall 323 and is connected to the cathode via a conductive adhesive 133 as described above.

The embodiments shown in FIGS. 1-3 are discussed herein in terms of only a single capacitor element. It should also be understood, however, that multiple capacitor elements may also be hermetically sealed within a housing. The multiple capacitor elements may be attached to the housing using any of a variety of different techniques, Referring to FIG. 4, for example one particular embodiment of a capacitor assembly 400 that contains two capacitor elements is shown and will now be described in more detail, More particularly, the capacitor assembly 400 includes a first capacitor element 420a in electrical communication with a second capacitor element 420b. In this embodiment, the capacitor elements are aligned so that their major surfaces are in a horizontal configuration. That is, a major surface of the capacitor element 420a defined by its width (−x direction) and length (−y direction) is positioned adjacent to a corresponding major surface of the capacitor element 420b. Thus, the major surfaces are generally coplanar. Alternatively, the capacitor elements may be arranged so that their major surfaces are not coplanar, but perpendicular to each other in a certain direction, such as the −z direction or the −x direction. Of course, the capacitor elements need not extend in the same direction.

Figure 4:
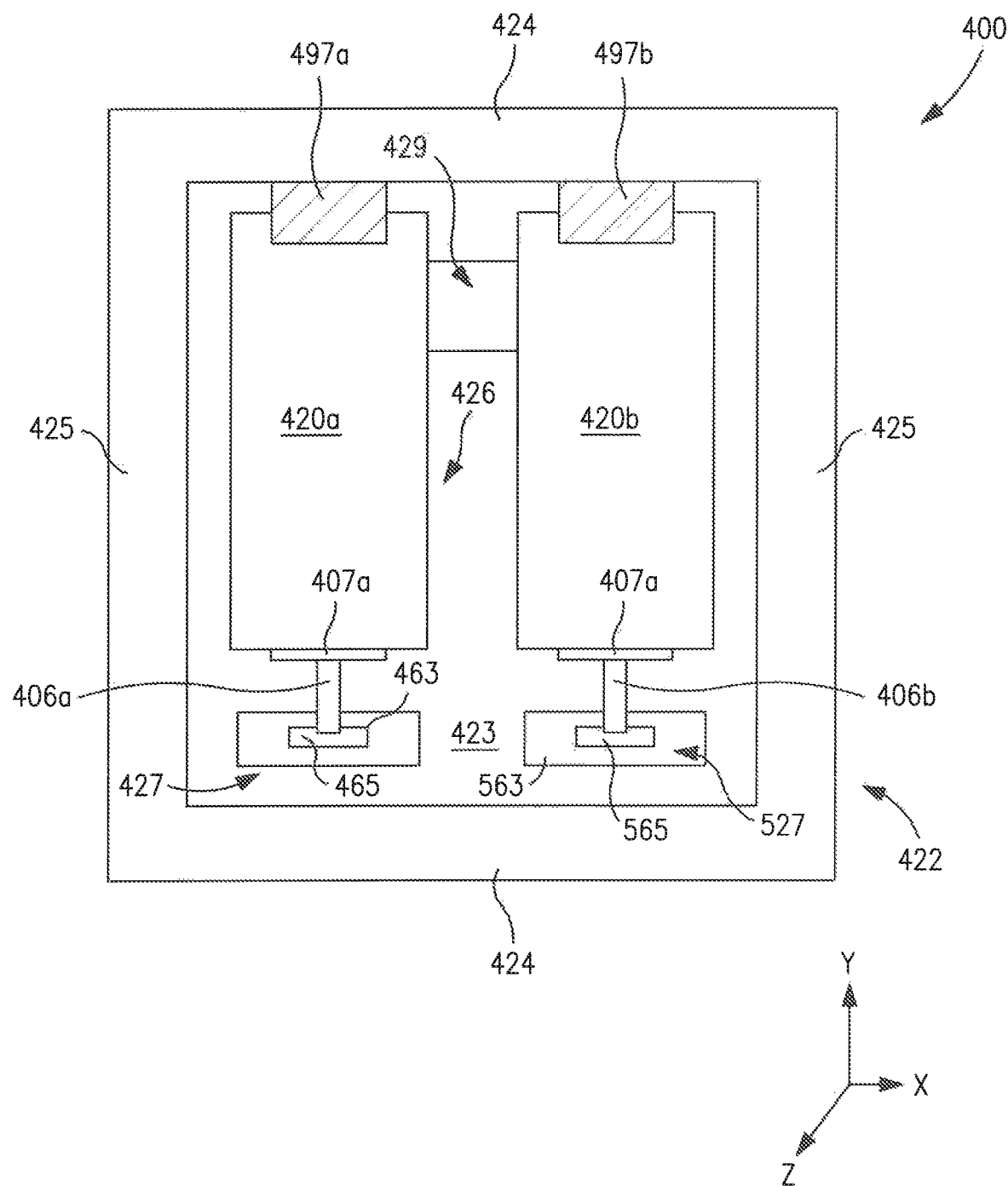
FIG. 4 is a top view of still another embodiment of a capacitor assembly of the assembly of the present invention.

The capacitor elements 420a and 420b are positioned within a housing 422 that contains an outer wall 423 and sidewalls 424 and 425 that together define a cavity 426. Although not shown, a lid may be employed that covers the upper surfaces of the sidewalls 424 and 425 and seals the assembly 400 as described above. Optionally, a polymeric restraint may also be employed to help limit the vibration of the capacitor elements. In FIG. 4, for example, separate polymer restraints 497a and 497b are positioned adjacent to and in contact with the capacitor elements 420a and 420b, respectively. The polymer restraints 497a and 497b may be positioned in a variety of different locations. Further, one of the restraints may be eliminated, or additional restraints may be employed. In certain embodiments, for example, it may be desired to employ a polymeric restraint between the capacitor elements to further improve mechanical stability.

In addition to the capacitor elements, the capacitor assembly also contains an anode termination to which anode leads of respective capacitor elements are electrically connected and a cathode termination to which the cathodes of respective capacitor elements are electrically connected. Referring again to FIG. 4, for example, the capacitor elements are shown connected in parallel to a common cathode termination 429. In this particular embodiment, the cathode termination 429 is initially provided in a plane that is generally parallel to the bottom surface of the capacitor elements and may be in electrical contact with conductive traces (not shown). The capacitor assembly 400 also includes connective members 427 and 527 that are connected to anode leads 407a and 407b, respectively, of the capacitor elements 420a and 420b. More particularly, the connective member 427 contains an upstanding portion 465 and a planar portion 463 that is in connection with an anode termination (not shown). Likewise, the connective 527 contains an upstanding portion 565 and a planar portion 563 that is in connection with an anode termination (not shown). Of course, it should be understood that a wide variety of other types of connection mechanisms may also be employed.

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance and Dissipation Factor

The capacitance and dissipation factor may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Leakage Current:

Leakage current ("DCL") may be measured using a leakage test set that measures leakage current at a temperature of 23°±2° C., 85°±2° C. and 125°±2° C. and at the rated voltage for 10, 20, 30, 40, 50, 60, and 300 seconds.

Example 1

34,000 μFV/g tantalum powder was used to form anode samples. Each anode sample was embedded with a tantalum wire, sintered at 1800° C., and pressed to a density of 5.6 g/cm³. The resulting pellets had a size of 5.20×3.70×0.85 mm. The pellets were anodized to 70V in a water/phosphoric acid electrolyte (conductivity 8.6 mS) at a temperature of 85° C. to form the dielectric layer. The pellets were anodized again to 160V in water/boric acid/disodium tetraborate (conductivity 2.0 mS) at a temperature of 30° C. for 30 seconds to form a thicker oxide layer built up on the outside. A conductive polymer coating was then formed by dipping the anodes into a dispersed poly(3,4-ethylenedioxythiophene) having a solids content 1.1% and viscosity 20 mPa·s (Clevios™ K, H. C. Starck). Upon coating, the parts were dried at 125° C. for 20 minutes. This process was repeated 10 times. Thereafter, the parts were dipped into a dispersed poly(3,4-ethylenedioxythiophene) having a solids content 2% and viscosity 20 mPa·s (Clevios™ K, H. C. Starck). Upon coating, the parts were dried at 125° C. for 20 minutes. This process was not repeated. Thereafter, the parts were dipped into a dispersed poly(3,4-ethylenedioxythiophene) having a solids content 2% and viscosity 160 mPa·s (Clevios™ K, H. C. Starck). Upon coating, the parts were dried at 125° C. for 20 minutes. This process was repeated 8 times. The parts were then dipped into a graphite dispersion and dried. Finally, the parts were dipped into a silver dispersion and dried.

The tantalum wire of the capacitor element was then laser welded to an anode connective member. The anode and cathode connective members were then glued to a gold cathode termination and welded to a gold anode termination located inside a ceramic housing having a length of 11.00 mm, a width of 6.00 mm, and a thickness of 2.20 mm. The housing had gold plated solder pads on the bottom inside part of ceramic housing. The adhesive employed for the cathode connection was a silver paste (EPO-Tek E3035) and the adhesive was applied only between the leadframe portions and gold plated solder pad. The welding employed for the anode connection was a resistance welding and an energy of 190 W was applied between the leadframe portions and ceramic housing gold plated solder pad during 90 ms. The assembly was then loaded in a convection oven to solder the paste. After that, a Kovar® lid having a length of 9.95 mm, a width of 4.95 mm, and a thickness of 0.10 mm was placed over the top of the container, closely on the seal ring of the ceramic housing (Kovar® ring having a thickness of 0.30 mm) so that there was no direct contact between the interior surface of the lid and the exterior surface of the attached capacitor. The resulting assembly was placed into a welding chamber and purged with nitrogen gas for 120 minutes/150° C. before seam welding between the seal ring and the lid was performed. No additional burn-in or healing was performed after the seam welding. Multiple parts (25) of 33 μF/25V capacitors were made in this manner.

Example 2

Capacitors were formed in the manner described in Example 1, except that a different conductive polymer coating was used. The conductive polymer coating was formed by dipping the anodes into a dispersed poly(3,4-ethylenedioxythiophene) having a solids content 1.1% and viscosity 20 mPa·s (Clevios™ K, H. C. Starck). Upon coating, the parts were dried at 125° C. for 20 minutes. This process was repeated 10 times. Thereafter, the parts were dipped into a dispersed poly(3,4-ethylenedioxythiophene) having a solids content 2% and viscosity 20 mPa·s (Clevios™ K, H. C. Starck) and additional 20% solids content of poly(ethylene glycol) with molecular weight 600 (Sigma Aldrich®). Upon coating, the parts were dried at 125° C. for 20 minutes. This process was not repeated. Thereafter, the parts were dipped into a dispersed poly(3,4-ethylenedioxythiophene) having a solids content 2% and viscosity 160 mPa·s (Clevios™ K, H. C. Starck). Upon coating, the parts were dried at 125° C. for 20 minutes. This process was repeated 8 times. The parts were then dipped into a graphite dispersion and dried. The assembly process was the same as described in Example 1. Multiple parts (25) of 33 μF/25V capacitors were made in this manner.

The finished capacitors of Examples were then tested for electrical performance. The median results of capacitance, Df and ESR and DCL are set forth below in Table 1-4. The wet capacitance was 38.0 μF.

TABLE 1

| | Cap [μF] | Dry/Wet Cap [%] | Df | ESR [mΩ] |
|---|---|---|---|---|
| Electrical Properties | | | | |
| Example 1 | 30.14 | 79.3 | 0.11 | 90.70 |
| Example 2 | 32.35 | 85.1 | 0.11 | 92.33 |

TABLE 2

Leakage Current [μA] @ 23 ± 2° C.

| | 10 s | 20 s | 30 s | 40 s | 50 s | 60 s | 300 s |
|---|---|---|---|---|---|---|---|
| Example 1 | 1385.53 | 797.87 | 536.03 | 392.35 | 303.63 | 244.53 | 35.66 |
| Example 2 | 11.47 | 4.71 | 2.74 | 1.85 | 1.37 | 1.07 | 0.15 |

TABLE 3

Leakage Current [μA] @ 85 ± 2° C.

| | 10 s | 20 s | 30 s | 40 s | 50 s | 60 s | 300 s |
|---|---|---|---|---|---|---|---|
| Example 1 | 29.59 | 15.79 | 10.68 | 7.57 | 5.81 | 4.66 | 1.61 |
| Example 2 | 1.61 | 0.96 | 0.72 | 0.57 | 0.50 | 0.44 | 0.18 |

TABLE 4

Leakage Current [μA] @ 125 ± 2° C.

| | 10 s | 20 s | 30 s | 40 s | 50 s | 60 s | 300 s |
|---|---|---|---|---|---|---|---|
| Example 1 | 10.51 | 5.95 | 4.49 | 3.81 | 3.40 | 3.11 | 2.14 |
| Example 2 | 3.21 | 1.99 | 1.50 | 1.22 | 1.04 | 0.91 | 0.33 |

As indicated, the DCL characteristics are significantly lower when poly(ethylene glycol) is employed (Example 2).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
   a capacitor element comprising a sintered porous anode body, a dielectric layer that overlies the anode body, and a solid electrolyte overlying the dielectric layer;
   a housing that defines an interior cavity within which the capacitor element is positioned and hermetically sealed;
   an anode termination that is in electrical connection with the anode body; and
   a cathode termination that is in electrical connection with the solid electrolyte;
   wherein the solid electrolyte contains a first layer that overlies the dielectric layer and a second layer that overlies the first layer, the first layer containing a conductive polymer and the second layer containing a hydroxy-functional nonionic polymer and a second conductive polymer.

2. The capacitor assembly of claim 1, wherein the interior cavity has a gaseous atmosphere that contains an inert gas, and wherein inert gases constitute from about 50 wt. % to 100 wt. % of the gaseous atmosphere.

3. The capacitor assembly of claim 1, further comprising a lead that extends in a lateral direction from the porous anode body, wherein the lead is positioned within the interior cavity of the housing.

4. The capacitor assembly of claim 3, further comprising a connective member that contains a first portion that is positioned generally perpendicular to the lateral direction of the anode lead and connected thereto.

5. The capacitor assembly of claim 4, wherein the connective member further contains a second portion that is generally parallel to the lateral direction in which the anode lead extends.

6. The capacitor assembly of claim 5, wherein the second portion is positioned within the housing.

7. The capacitor assembly of claim 1, wherein the anode body is formed from a powder that contains tantalum, niobium, or an electrically conductive oxide thereof.

8. The capacitor assembly of claim 1, wherein the conductive polymer, the second conductive polymer, or both the conductive polymer and second conductive polymer, is poly(3,4-ethylenedioxythiophene).

9. The capacitor assembly of claim 1, wherein the solid electrolyte comprises a plurality of pre-polymerized conductive polymer particles.

10. The capacitor assembly of claim 1, wherein the conductive polymer contained in the second layer further comprises a plurality of pre-polymerized conductive polymer particles.

11. The capacitor assembly of claim 1, wherein the hydroxy-functional polymer is a polyalkylene ether.

12. The capacitor assembly of claim 11, wherein the polyalkylene ether is a polyalkylene glycol.

13. The capacitor assembly of claim 1, further comprising an external polymer coating that overlies the solid electrolyte, wherein the external polymer coating contains a plurality of pre-polymerized conductive polymer particles.

14. The capacitor assembly of claim 13, wherein the external polymer coating contains a first layer that overlies the solid electrolyte and a second layer that overlies the first layer, wherein the first layer contains a crosslinking agent and the second layer contains the pre-polymerized conductive polymer particles.

15. The capacitor assembly of claim 1, wherein the assembly exhibits a wet-to-dry capacitance of about 60% or more.

16. A method of forming a capacitor assembly that comprises a capacitor element comprising a sintered porous anode body, a dielectric layer that overlies the anode body, and a solid electrolyte overlying the dielectric layer, the capacitor assembly further comprising a housing that defines an interior cavity within which the capacitor element is positioned and hermetically sealed, the method comprising:
   positioning the capacitor element within the interior cavity of the housing;
   electrically connecting the anode body of the capacitor element to an anode termination and the solid electrolyte of the capacitor element to a cathode termination; and
   hermetically sealing the capacitor element within the housing;

wherein the solid electrolyte is formed by a method that comprises forming a first layer that contains a conductive polymer, and thereafter forming a second layer that overlies the first layer and contains a second conductive polymer and a hydroxy-functional nonionic polymer.

17. The method of claim 16, wherein the hydroxy-functional polymer is applied in the form of a dispersion that contains a plurality of pre-polymerized conductive polymer particles.

18. The method of claim 16, wherein the hydroxy-functional nonionic polymer is applied in the form of a solution.

* * * * *